United States Patent
Ash et al.

(10) Patent No.: US 12,553,542 B2
(45) Date of Patent: Feb. 17, 2026

(54) FLASHING FREE CONDUIT MOUNT

(71) Applicant: Enstall US, Inc., Walnut Creek, CA (US)

(72) Inventors: Jon Ash, Phoenix, AZ (US); Roger Pedlar, Phoenix, AZ (US); Brian Fernando, Avondale, AZ (US)

(73) Assignee: Enstall US, Inc., Hayward, CA (US)

( * ) Notice: Subject to any disclaimer, the term of this patent is extended or adjusted under 35 U.S.C. 154(b) by 0 days.

(21) Appl. No.: 18/432,936

(22) Filed: Feb. 5, 2024

(65) Prior Publication Data

US 2024/0263720 A1 Aug. 8, 2024

Related U.S. Application Data

(60) Provisional application No. 63/483,057, filed on Feb. 3, 2023.

(51) Int. Cl.
*F16L 3/20* (2006.01)
*F16L 3/10* (2006.01)

(52) U.S. Cl.
CPC .............. *F16L 3/20* (2013.01); *F16L 3/1033* (2013.01)

(58) Field of Classification Search
CPC .................................. F16L 3/20; F16L 3/1033
See application file for complete search history.

(56) References Cited

U.S. PATENT DOCUMENTS

| | | | | |
|---|---|---|---|---|
| 4,502,653 A * | 3/1985 | Curtis, Jr. | ................. | F16L 3/18 248/74.1 |
| 9,800,199 B2 * | 10/2017 | Meine | ..................... | H02S 20/23 |
| 10,337,764 B2 * | 7/2019 | Ash | ......................... | F24S 25/00 |
| 2010/0088996 A1 * | 4/2010 | Thompson | .............. | F24S 25/61 52/704 |
| 2017/0346439 A1 * | 11/2017 | Pereira | ..................... | H02G 3/00 |
| 2018/0062560 A1 * | 3/2018 | Stephan | .................. | F24S 25/30 |
| 2018/0254737 A1 * | 9/2018 | Wong | ...................... | H02S 20/23 |
| 2018/0337627 A1 * | 11/2018 | Tomlinson | .............. | H02S 40/34 |
| 2020/0313608 A1 * | 10/2020 | Stephan | .................. | H02S 20/23 |
| 2021/0234500 A1 * | 7/2021 | Stephan | .................. | F24S 40/80 |

FOREIGN PATENT DOCUMENTS

| WO | WO-2020186115 A1 * | 9/2020 | ............. | F24S 25/61 |
| WO | WO-2021102062 A1 * | 5/2021 | ............ | F16B 5/0233 |

OTHER PUBLICATIONS https://www.ironridge.com/quickmount/documents/ Quickmount PV catalog dated 2018 (Year: 2018).*
Arlington industries online article in cabling installation and maintenance titled "Support conduit atop the roof" dated Dec. 22, 2011 https://www.cablinginstall.com/home/article/16475652/arlington-industries-inc-support-conduit-atop-the-roof (Year: 2011).*

(Continued)

*Primary Examiner* — Terrell L Mckinnon
*Assistant Examiner* — Ding Y Tan
(74) *Attorney, Agent, or Firm* — The Webb Law Firm

(57) ABSTRACT

A mounting device includes an attachment block. The attachment block includes a monolithic body defining a receiving surface, a recessed portion defined by the monolithic body, an opening defined in the recessed portion of the monolithic body, and a clip attachment portion defined in the monolithic body.

19 Claims, 17 Drawing Sheets

(56) References Cited

OTHER PUBLICATIONS

Classic Comp Conduit Mount (QMCC) datasheet from Quick Mount PV dated Apr. 3, 2019 https://files.ironridge.com/quickmount/QMPV-datasheet-QMCC-Conduit-web.pdf (Year: 2019).*
Ironridge FX system installation manual dated 2018 version 1.8 (Year: 2018).*
Eaton dura-blok rooftop supports BRTS-18 B-Line series catalog published in Jun. 2018, https://www.eaton.com/content/dam/eaton/products/support-systems/dura-blok-rooftop-support-systems/Dura-blok-rooftop-support-system-brochure-BR300001EN.pdf (Year: 2018).*
Bullke rooftop pipe support for supporting conduits in support blocks in 8 pack sold on amazon dated Feb. 3, 2021, https://www.amazon.com/Rooftop-Support-Hardware-capacity-Resistant/dp/B08VTXC9KG (Year: 2021).*

* cited by examiner

FLASHING FREE CONDUIT MOUNT

CROSS REFERENCE TO RELATED APPLICATION

This application claims priority to the U.S. Provisional Patent Application No. 63/483,057 filed on Feb. 3, 2023, the disclosure of which is hereby incorporated by reference in its entirety.

BACKGROUND OF THE INVENTION

Field of the Invention

The present disclosure relates generally to roof mounting devices and, more particularly, to flashing free conduit mounts.

Description of Related Art

Roofs, particularly photovoltaic roofs, typically require conduit housing wires to be mounted on the roof structure. Current solutions for attaching conduit to photovoltaic roofs include cumbersome mounting devices that require flashing. Drawbacks include susceptibility to water damage to the roof after drilling through the roof, difficulty during installation, particularly with handling small parts on a slanted roof, difficulty mounting at different orientations based upon the roof layout, inability to adjust conduit post installation of mount to roof, and inability to change orientation after installation.

Accordingly, those skilled in the art continue research and development efforts in the field of mounting conduit to roofs.

SUMMARY OF THE INVENTION

According to non-limiting embodiments or aspects, a mounting device may include: a top portion defining a first annular lip and a sidewall; a base portion coupled to the top portion, the base portion defining an opening; a channel defined between the top portion and the base portion; and a clip fastener moveably housed in the channel.

The mounting device may include a top portion that defines a receiving surface for receiving a structure. The first annular lip may have a diameter greater than a diameter of the sidewall. The base portion may define at least one drain port. The base portion may define a second annular lip having a top surface that is substantially aligned with the receiving surface of the top piece. The mounting device may further include a seal coupled to the base portion. The base portion may define a recessed portion configured to couple with the seal. The seal may be a dual pad seal. The mounting device may further include a mount fastener removably engageable with the opening.

According to non-limiting embodiments or aspects, a mounting device may include an attachment block, the attachment block comprising: a monolithic body defining a receiving surface; a recessed portion defined by the monolithic body; an opening defined in the recessed portion of the monolithic body; and a clip attachment portion defined in the monolithic body.

The clip attachment portion may include a recessed track. The clip attachment portion may include at least one opening. The clip attachment portion may include a plurality of openings. The clip attachment portion may include at least one dimple. The clip attachment portion may include a plurality of dimples. The plurality of dimples may be arranged in a single row parallel to a center axis (A). The plurality of dimples may be arranged in two or more rows parallel to a center axis (A). The recessed portion may define at least one drain port. The opening may be threaded. The mounting device may further include a mount fastener removably coupleable with the opening. The mount fastener may be a screw. The mount fastener may be threadedly engageable with the opening.

According to non-limiting embodiments or aspects, a system for mounting a structure to a roof, the system may include: a mounting device having an attachment block, the attachment block comprising: a monolithic body defining a receiving surface; a recessed portion defined by the monolithic body; an opening defined in the recessed portion of the monolithic body; and a clip attachment portion defined in the monolithic body; and a clip removably coupled to the mounting device.

The clip may be rotatable 360° about the mounting device. The clip may be a single monolithic structure. The structure may be a conduit. The system may further include a clip fastener removably engageable with the clip attachment portion. The clip fastener may be threadedly engageable with the clip and the clip attachment portion of the mounting device. The clip fastener may be a self-drilling screw. The clip may be rotatable 360° about the clip fastener. The clip fastener may be a bolt. The system may further include a mount fastener. The mount fastener may be a screw. The attachment block may be rotatable 360° about the mount fastener.

In some non-limiting embodiments or aspects, the present disclosure can be characterized by the following clauses:

Clause 1. A mounting device comprising: a top portion defining a first annular lip and a sidewall; a base portion coupled to the top portion, the base portion defining an opening; a channel defined between the top portion and the base portion; and a clip fastener moveably housed in the channel.

Clause 2. The mounting device of clause 1, wherein top portion defines a receiving surface for receiving a structure.

Clause 3. The mounting device of clause 1, wherein the first annular lip has a diameter greater than a diameter of the sidewall.

Clause 4. The mounting device of clause 1, wherein the base portion defines at least one drain port.

Clause 5. The mounting device of clause 1, wherein the base portion defines a second annular lip having a top surface that is substantially aligned with the receiving surface of the top piece.

Clause 6. The mounting device of clause 1, further comprising a seal coupled to the base portion.

Clause 7. The mounting device of clause 6, wherein the base portion defines a recessed portion configured to couple with the seal.

Clause 8. The mounting device of clause 6, wherein the seal is a dual pad seal.

Clause 9. The mounting device of clause 1, further comprising a mount fastener 150 removably engageable with the opening.

Clause 10. A mounting device comprising: an attachment block, the attachment block comprising: a monolithic body defining a receiving surface; a recessed portion defined by the monolithic body; an opening defined in the recessed portion of the monolithic body; and a clip attachment portion defined in the monolithic body.

Clause 11. The mounting device of clause 10, wherein the clip attachment portion comprises a recessed track.

Clause 12. The mounting device of clause 10, wherein the clip attachment portion comprises at least one opening.

Clause 13. The mounting device of clause 10, wherein the clip attachment portion comprises a plurality of openings.

Clause 14. The mounting device of clause 10, wherein the clip attachment portion comprises at least one dimple.

Clause 15. The mounting device of clause 10, wherein the clip attachment portion comprises a plurality of dimples.

Clause 16. The mounting device of clause 15, wherein the plurality of dimples are arranged in a single row parallel to a center axis A.

Clause 17. The mounting device of clause 15, wherein the plurality of dimples are arranged in two or more rows parallel to a center axis A.

Clause 18. The mounting device of clause 10, wherein the recessed portion defines at least one drain port.

Clause 19. The mounting device of clause 10, wherein the opening is threaded.

Clause 20. The mounting device of clause 10, further comprising a mount fastener removably coupleable with the opening.

Clause 21. The mounting device of clause 20, wherein the mount fastener is a screw.

Clause 22. The mounting device of clause 20, wherein the mount fastener is threadedly engageable with the opening.

Clause 23. A system for mounting a structure to a roof, the system comprising: a mounting device having an attachment block, the attachment block comprising: a monolithic body defining a receiving surface; a recessed portion defined by the monolithic body; an opening defined in the recessed portion of the monolithic body; and a clip attachment portion defined in the monolithic body; and a clip removably coupled to the mounting device.

Clause 24. The system of clause 23, wherein the clip is rotatable 360° about the mounting device.

Clause 25. The system of clause 23, wherein the clip is a single monolithic structure.

Clause 26. The system of clause 23, wherein the structure is conduit.

Clause 27. The system of clause 23, further comprising a clip fastener removably engageable with the clip attachment portion.

Clause 28. The system of clause 27, wherein the clip fastener is threadedly engageable with the clip and the clip attachment portion of the mounting device.

Clause 29. The system of clause 27, wherein the clip fastener is a self-drilling screw.

Clause 30. The system of clause 27, wherein the clip is rotatable 360° about the clip fastener.

Clause 31. The system of clause 27, wherein the clip fastener is a bolt.

Clause 32. The system of clause 23, further comprising a mount fastener.

Clause 33. The system of clause 32, wherein the mount fastener is a screw.

Clause 34. The system of clause 32, wherein the attachment block is rotatable 360° about the mount fastener.

BRIEF DESCRIPTION OF THE DRAWINGS

The above-mentioned and other features and advantages of this disclosure, and the manner of attaining them, will become more apparent and the disclosure itself will be better understood by reference to the following descriptions of embodiments of the disclosure taken in conjunction with the accompanying drawings, wherein.

DETAILED DESCRIPTION OF THE INVENTION

Figure 1:
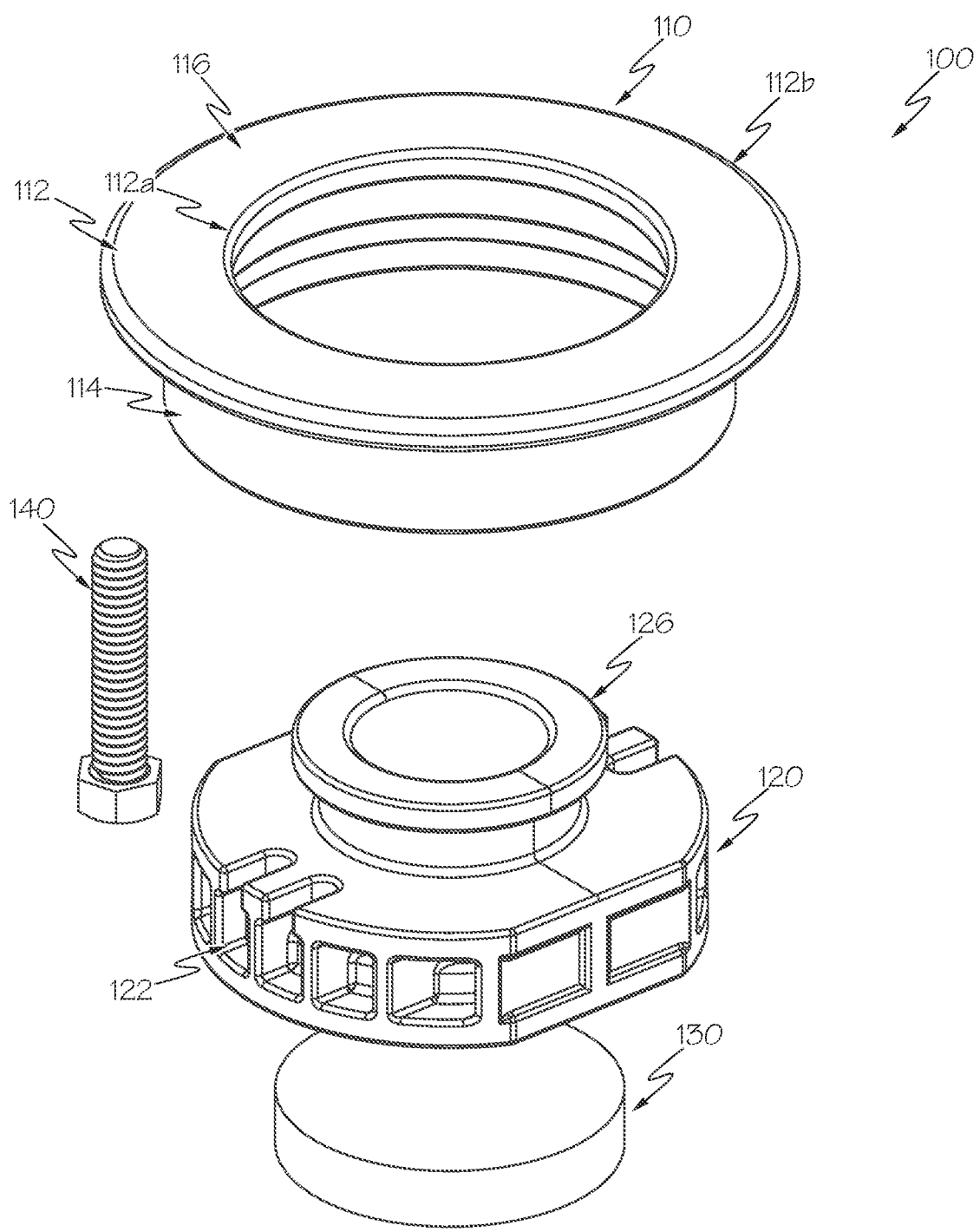
FIG. 1 is an exploded view of a mounting device.

The following description is provided to enable those skilled in the art to make and use the described aspects contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For the purposes of the description hereinafter, the terms "upper", "lower", "right", "left", "vertical", "horizontal", "top", "bottom", "lateral", "longitudinal", and derivatives thereof shall relate to the invention as it is oriented in the drawings. However, it is to be understood that the invention may assume various alternative variations, except where expressly specified to the contrary. It is also to be understood that the specific devices illustrated in the attached drawings, and described in the following specification, are simply exemplary aspects of the invention. Hence, specific dimensions and other physical characteristics related to the aspects disclosed herein are not to be considered as limiting.

All numbers used in the specification and claims are to be understood as being modified in all instances by the term "about". By "about" is meant a range of plus or minus ten percent of the stated value. As used in the specification and the claims, the singular form of "a", "an", and "the" include plural referents unless the context clearly dictates otherwise. The terms "first", "second", and the like are not intended to refer to any particular order or chronology, but instead refer to different conditions, properties, or elements. By "at least" is meant "greater than or equal to".

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The disclosure provides various examples of a mounting device and associated system that allows mounting of a structure, such as conduit, and more specifically ¾" or 1" electrical conduit, to a roof, such as a comp shingle roof. The disclosed mounting devices and systems allow an installer a simplified solution to mounting devices to roofs, and particularly photovoltaic roof systems. Upon mounting, the structure or conduit can be oriented and mounted to the disclosed mounting device about a 360° orientation depending on user preference.

The disclosed mounting devices and systems offer a flashing free sealing to a roof with quick installation while reducing damage to shingles by not requiring removal of nails between shingles and/or insertion of a flashing for sealing. The disclosed mounting devices and systems utilize a secured fastener that will fall out during installation to the conduit and therefore will not fall down roof during installation. The conduit can be oriented at any angle 360° about the mounting device to accommodate any specific application. Connection of the conduit is separate from the roof attachment sealing, allowing the user to make as many adjustments or reinstallations as required to the conduit without compromising seal path. Finally, water drainage features incorporated in the mounting devices and systems ensure water is not trapped in the mounting devices and systems.

Referring generally to FIGS. 1-20, disclosed is a mounting device 100, 300, 400, and 600. The mounting device may be any shape and geometry without changing the scope of the disclosure. For example, the mounting device may be generally round, oblong shaped, rectangular, elongated rectangular, triangular, or any other shape. As illustrated in FIGS. 1-5, the mounting device 100 may be generally round. The mounting device 100 is configured to facilitate mounting a structure 220, such as conduit, to a roof 800, such as a photovoltaic roof, FIG. 20. In one example, the top portion 110 defines a receiving surface 116 for receiving a structure 220.

The mounting device 100 includes a top portion 110 defining a first annular lip 112 and a sidewall 114. The top portion 110 may be a singular, monolithic piece such that the first annular lip 112 and the sidewall 114 are integral. In one example, the first annular lip 112 may have a diameter greater than a diameter of the sidewall 114.

Figure 3:
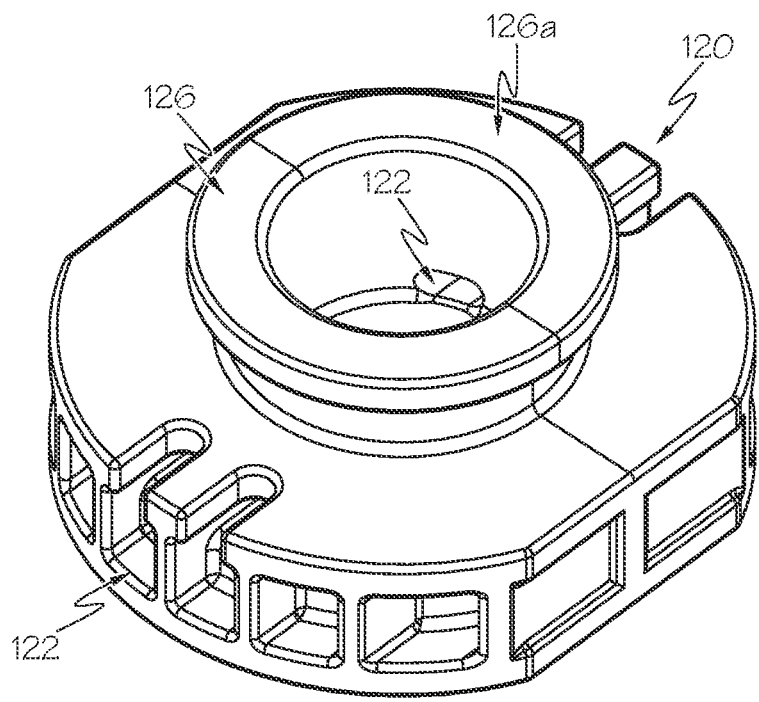
FIG. 3 is a perspective view of a portion of the mounting device of FIG. 1.

Still referring to FIG. 1 and FIG. 3, the mounting device 100 includes a base portion 120 coupled to the top portion 110. The base portion defines an opening 124 for receiving a fastener, such as a screw. In one example, the base portion 120 defines at least one drain port 122, see FIG. 1. In another example, the base portion 120 defines more than one drain ports 122. The drain ports 122 may be disposed about the circumference of the base portion 120, or may be laterally opposed from each other about the base portion 120. The base portion 120 defines a second annular lip 126 having a top surface 126a that is substantially aligned with the receiving surface 116 of the top piece 110. As shown in FIG. 3, the base portion 120 may have a generally round shape with at least one chamfered portion to further facilitate drainage of water through the mounting device 100.

Figure 2:
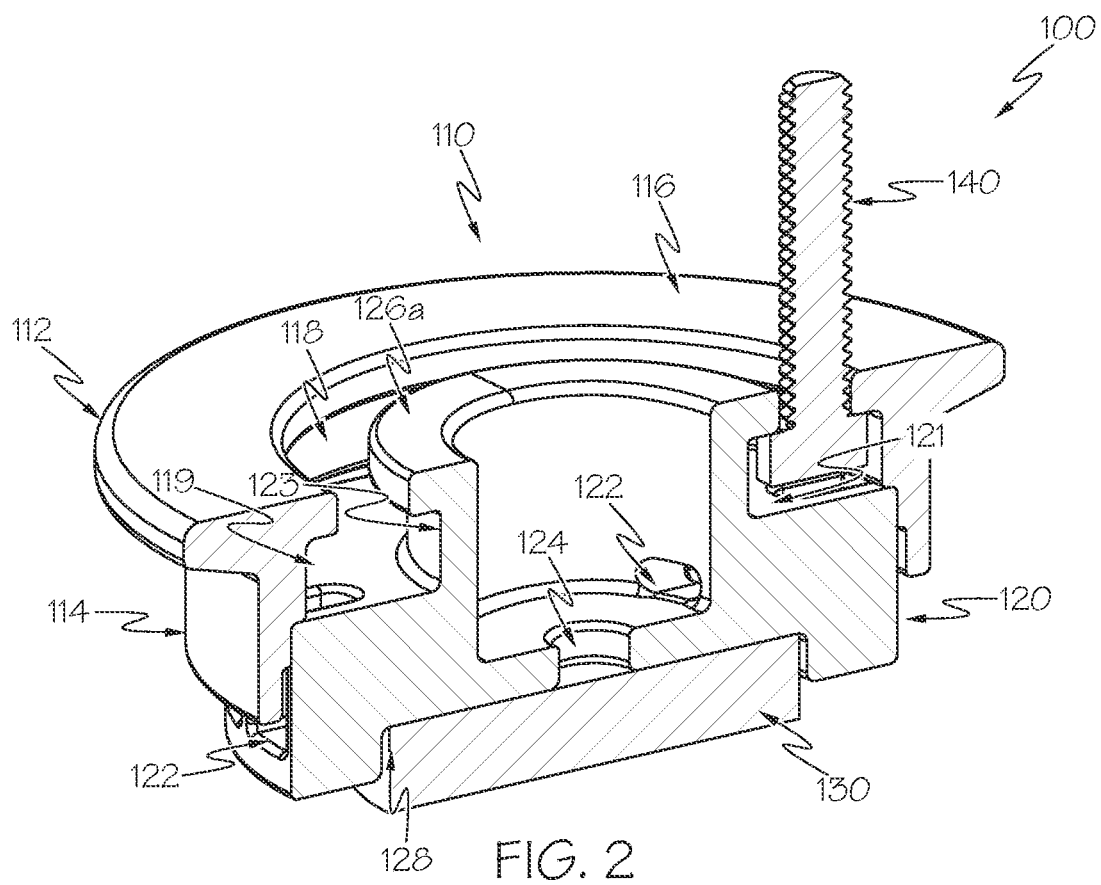
FIG. 2 is a cross-sectional view of the mounting device of FIG. 1.
Figure 4:
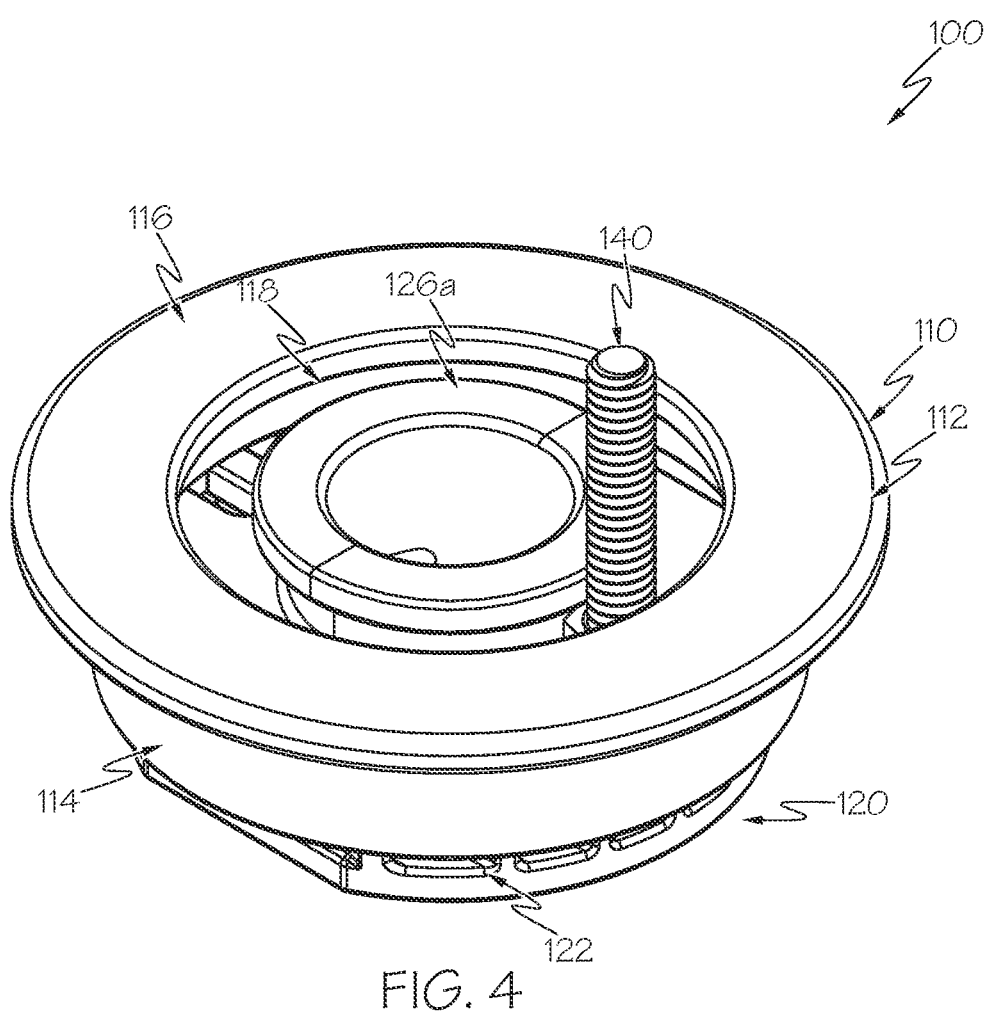
FIG. 4 is a perspective view of the mounting device of FIG. 1.

Referring to FIG. 2, the mounting device 100 includes a channel 118 defined between the top portion 110 and the base portion 120. The channel 118 may be defined by the first annular lip 112 of the top portion 110 and the second annular lip 126 of the base portion 120. For example, the channel 118 may be generally shaped and sized to loosely house a clip fastener 140, such as a screw or a bolt, such that the fastener is moveably 360° about the entirety of the channel 118 without becoming dislodged from the channel 118. As shown in FIG. 2, a cross-section of the top portion 110 shows a generally t-shaped configuration to facilitate loose housing of the clip fastener 140. As shown in FIG. 4, a perspective view of the mounting device 100 with the base portion 120 coupled to the top portion 110 is shown. The clip fastener 140 is secured between the base portion 120 and the top portion 110, and is movable within the channel 118.

Referring to FIGS. 1 and 2, the mounting device 100 includes a clip fastener 140 moveably housed in the channel 118. The clip fastener 140 is loosely housed in the channel 118 such that it can rotate 360° about the entirety of the channel 118 but will not become separated from the mounting device 100. In one example, the clip fastener 140 is a screw. In another example, the clip fastener 140 is a bolt. In yet another example, the clip fastener 140 is a self-drilling screw.

Referring to FIGS. 1 and 2, the mounting device 100 further includes a seal 130 coupled to the base portion 120. In one example, the base portion 120 defines a recessed portion 128 configured to couple with the seal 130. The seal 130 may be a dual pad seal that is compressed against a bottom surface of the recessed portion 128 and provides resistance to water infiltration through the penetration in the roof 800. The dual pad seal may include a compression pad and a seal pad, and may be comprised of any material having requisite material properties including foam, rubber, butyl, sealant tape, mastic, etc. In one example, the seal 130 further includes a removable film layer having a pull-tab. The removable film layer is configured to protect an adhesive surface of the seal 130 until the mounting device 100 is to be mounted to the roof 800.

Figure 5:
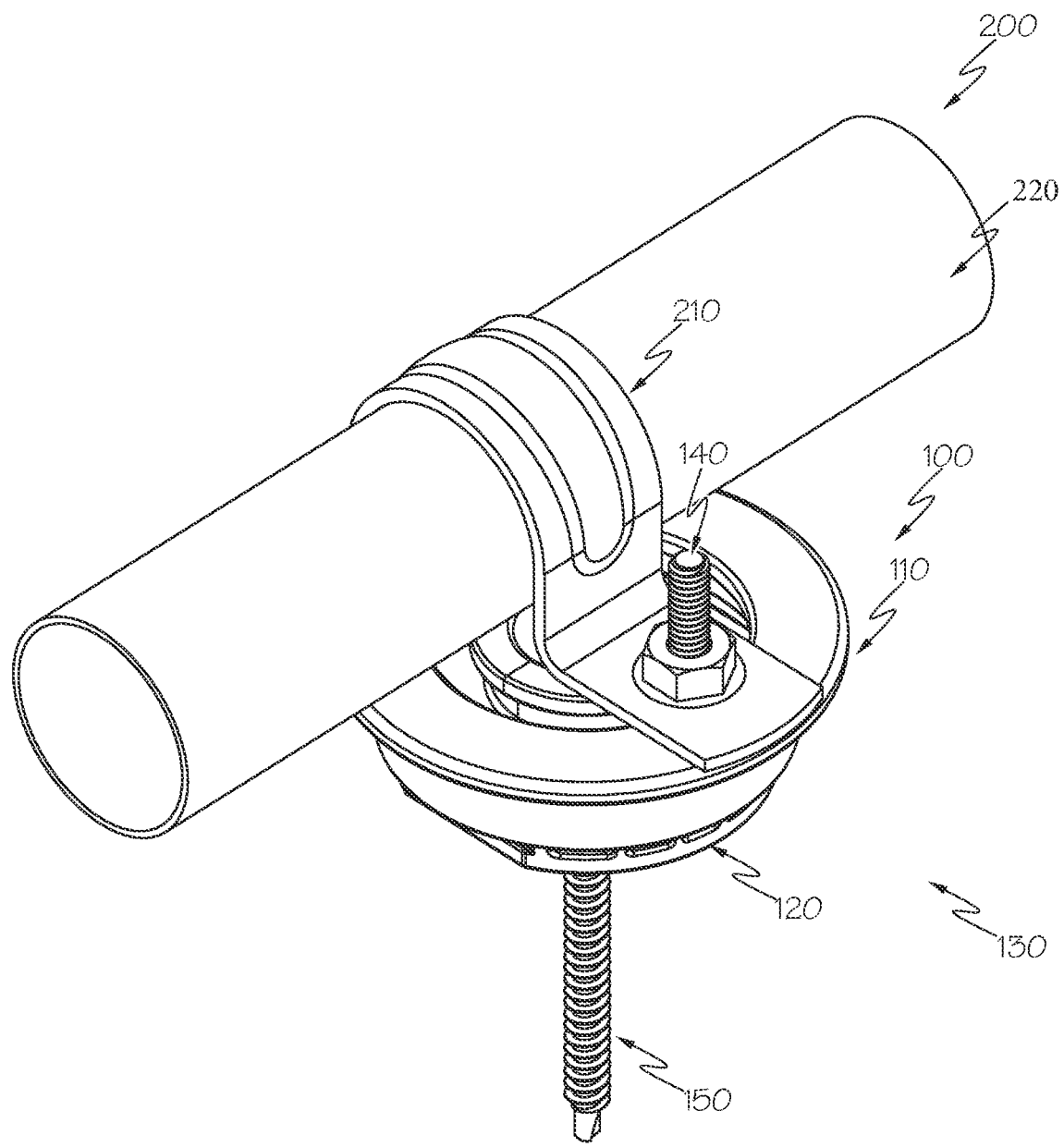
FIG. 5 is a perspective view of a system for mounting a structure to a roof.
Figure 6:
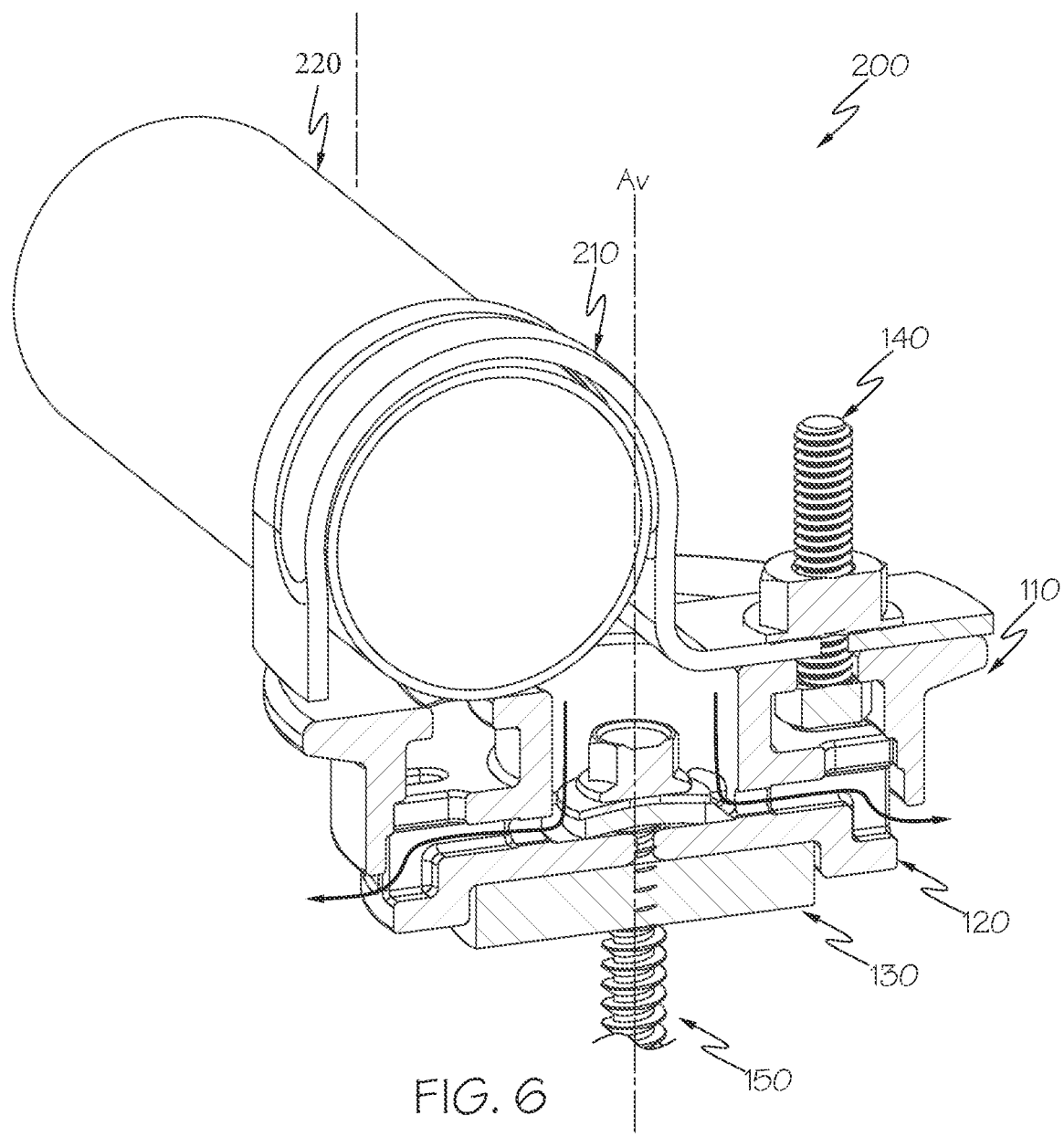
FIG. 6 is a cross-sectional view of the system of FIG. 5.

Referring to FIGS. 5 and 6, in one or more examples, the mounting device 100 further includes a mount fastener 150 removably engageable with the opening 124. The mount fastener 150 may be threadedly engageable with the opening 124, or may be in abutting engagement with the opening 124 of the base portion 120 such that upon fastening in place, the mount fastener 150 head holds the mounting device 100 in place. In one example, the mount fastener 150 is a screw, such as a deck screw. The mount fastener 150 may extend through the center of the top portion 110 and the base portion 120 through the seal 130 along a vertical axis $A_V$.

Still referring to FIGS. 5 and 6, also disclosed is a system 200 for mounting a structure 220 onto a roof 800. The system 200 includes a mounting device 100 as shown and described herein and a clip 210 removably coupled to the mounting device 100. The clip 210 may be any commercially available clip for holding a structure at a desired orientation, such as a conduit clip. The clip 210 may have a generally curved portion configured to fit around the structure 220, such as conduit, and may have a generally flat, tabular portion having an opening to receive the clip fastener 140. It is understood that any size and shape clip 210 may be used to accommodate any conduit or structure 220 diameter and/or geometry and size needed to mount the structure 220 securely to a roof 800.

Referring generally to FIGS. 7-19D, disclosed are other examples of a mounting device 300, 400, and 600. The following examples allow mounting of a structure, such as conduit, to a roof 800 at any desired orientation.

Figure 7:
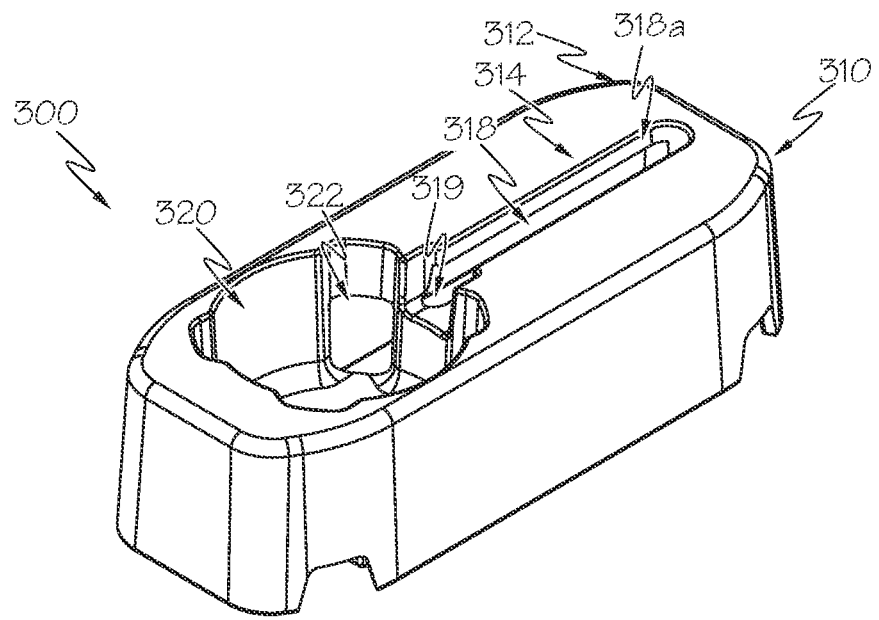
FIG. 7 is a perspective top view of a mounting device.
Figure 8A:
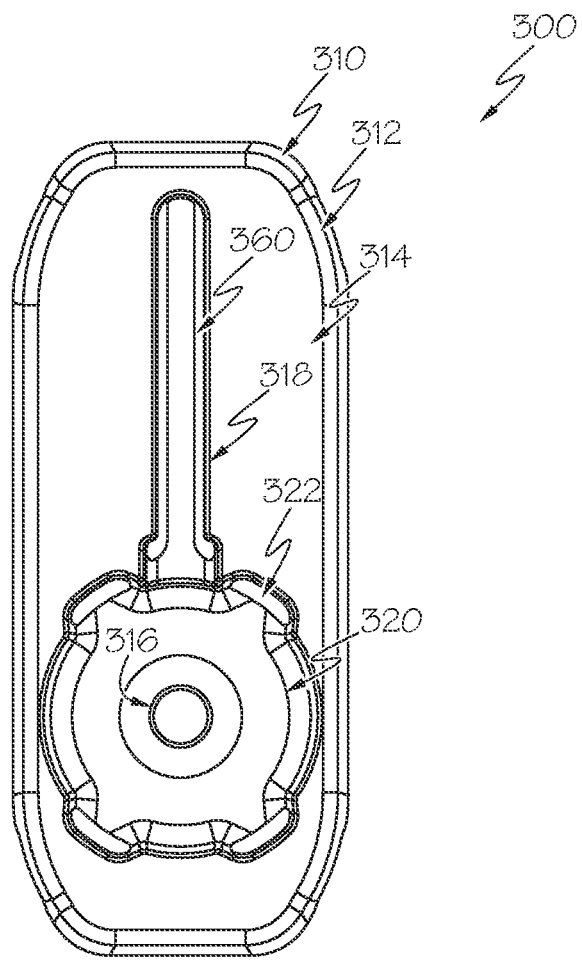
FIG. 8A is a top view of the mounting device of FIG. 7.
Figure 8B:
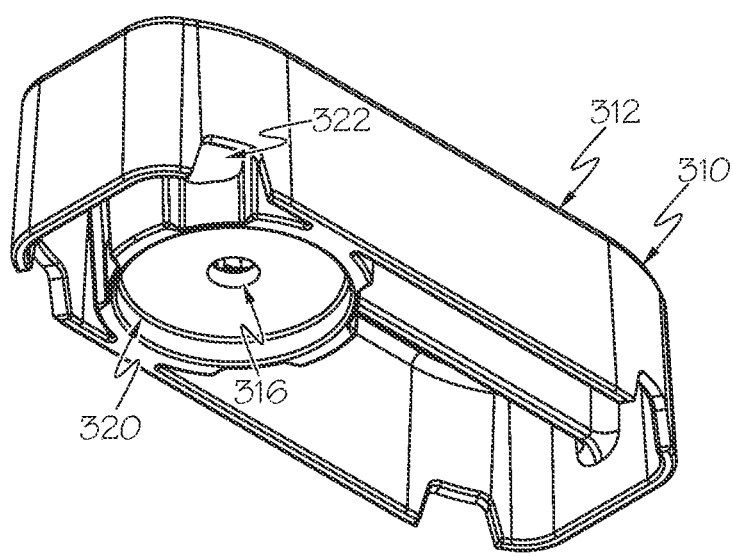
FIG. 8B is a perspective bottom view of the mounting device of FIG. 7.
Figure 9:
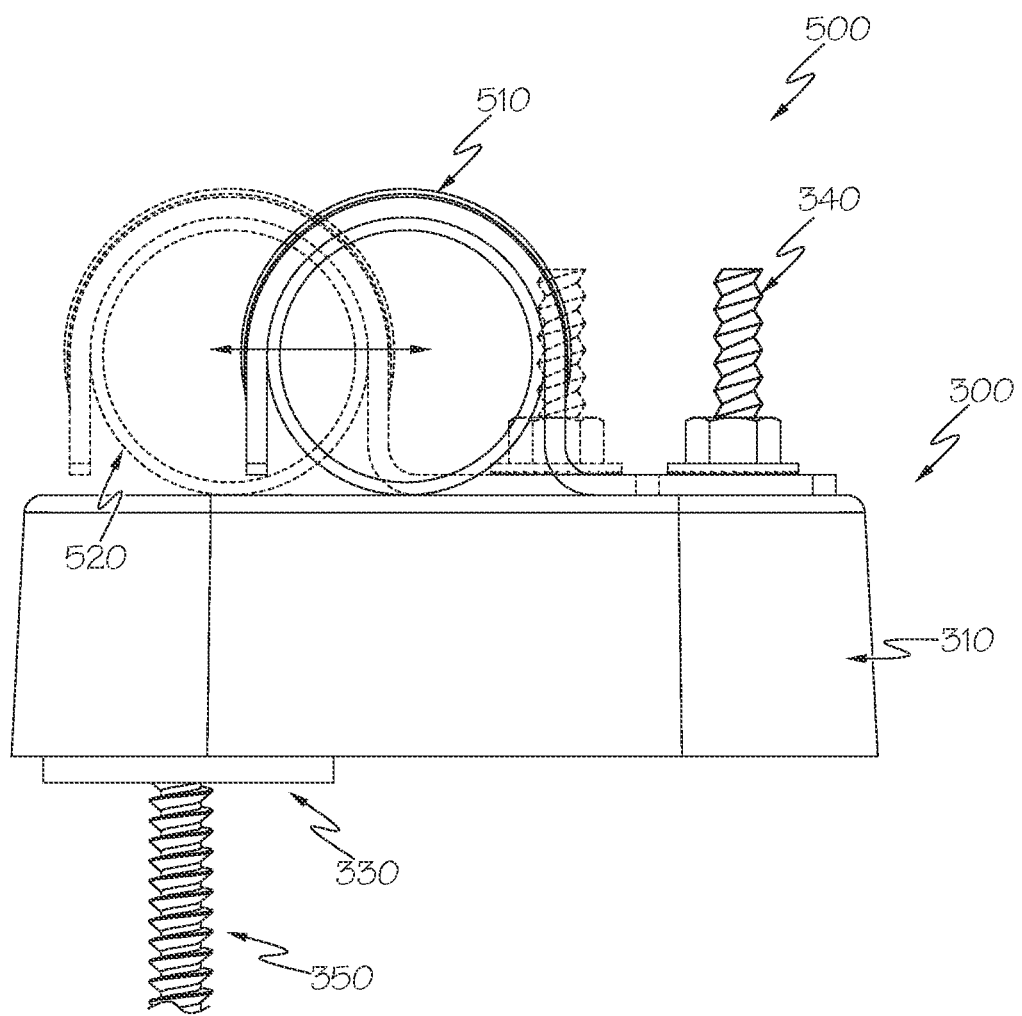
FIG. 9 is a side view of the mounting device of FIG. 7.
Figure 11:
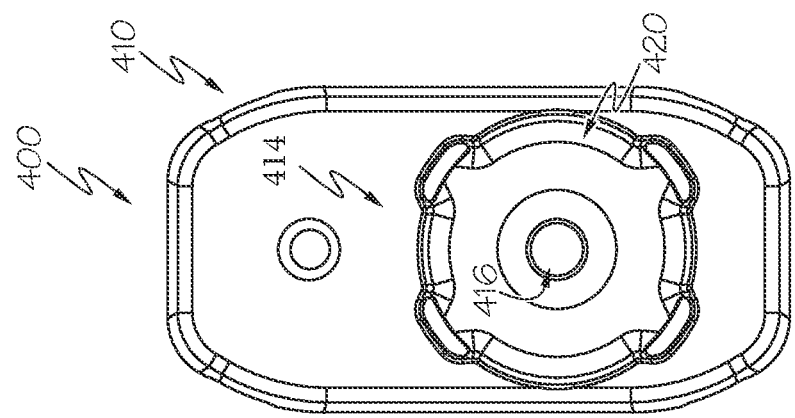
FIG. 11 is a top view of a mounting device.
Figure 10:
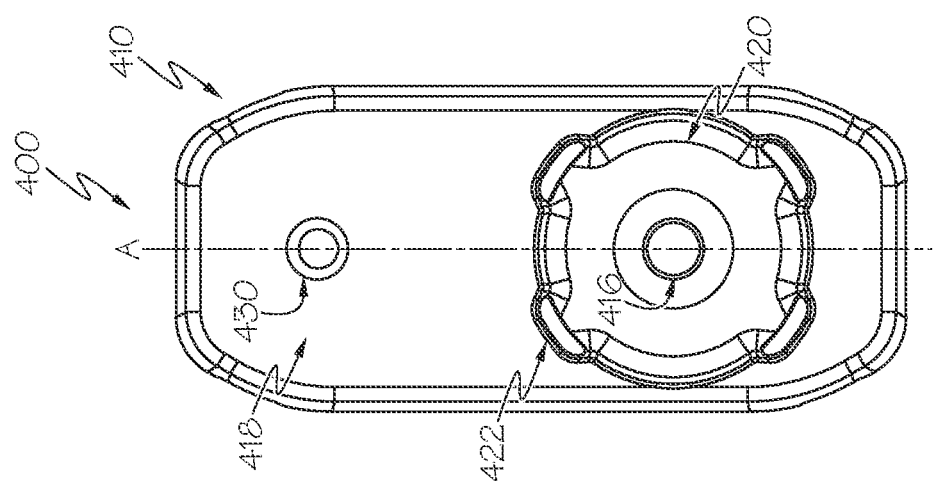
FIG. 10 is a top view of a mounting device.

Referring initially to FIGS. 7-9, a mounting device 300 includes an attachment block 310. The attachment block 310 includes a monolithic body 312 defining a receiving surface 314. In one example, the attachment block 310 is a single, molded piece.

Still referring to FIGS. 7-9, the attachment block 310 defines a recessed portion 320 defined by the monolithic body 312. The recessed portion 320 may be generally round with one or more notches defined to facilitate water drainage.

Referring to FIGS. 8A and 8B, the attachment block 310 defines an opening 316 defined in the recessed portion 320 of the monolithic body 312. The opening 316 may be sized and shaped for receiving a mount fastener 350, such as a deck screw. In one example, the opening 316 is threaded such that it is configured to threadedly engage with a mount fastener 350.

In accordance with above, the mounting device 300 may further include a mount fastener 350 removably coupleable with the opening 316, as shown in FIG. 9. In one example, the mount fastener 350 is a screw. In another example, the mount fastener 350 is threadedly engageable with the opening 316. The mount fastener 350 may be configured to secure the mounting device 300 to a roof 800.

Referring to FIGS. 7-9, the attachment block 310 further includes a clip attachment portion 318 defined in the monolithic body 312. The clip attachment portion 318 is configured to receive at least a portion of a clip and clip fastener 340 to couple the clip and attachment block 310 together. In one example, the clip attachment portion 318 includes a recessed track 360. The recessed track 360 may be configured to receive and engage with a clip fastener 340. The clip attachment portion 318 may define a lip portion 318a. The lip portion 318a may be abutting a stop surface of the attachment block 310 and bulging into the clip attachment portion 318. The lip portion 318a may be configured to keep a clip fastener 340 within the clip attachment portion 318, such that the clip fastener 340 is only movable along the recessed track 360. As shown in FIG. 9, the clip fastener 340 may be movable within the recessed track, or in the direction of the arrow. The clip fastener 340 may be placed onto the recessed track 360 via a slot 319 defined by the attachment block 310. In one example, the clip fastener 340 is a screw, such as a self-drilling screw.

Still referring to FIGS. 7-9, the recessed portion 320 may be generally round with one or more notches defined to facilitate water drainage. Specifically, the recessed portion 320 may define at least one drain port 322. In another example, the recessed portion 320 defines more than one drain ports 322.

Referring to FIG. 9, the mounting device 300 may further include a seal 330. In one example, the seal 330 is a dual-seal pad. The seal 330 may be coupled to the recessed portion 320 of the attachment block 310. As discussed more in detail below, the mounting device 300 may include a clip 510 configured to secure a structure 520.

Referring to FIGS. 10-14, disclosed is another example of a mounting device 400. The mounting device 400 includes an attachment block 410. The attachment block 410 includes a monolithic body 412 defining a receiving surface 414. In one example, the attachment block 410 is a single, molded piece.

Still referring to FIGS. 10-14, the attachment block 410 defines a recessed portion 420 defined by the monolithic body 412. The recessed portion 420 may be generally round with one or more notches defined to facilitate water drainage. Specifically, the recessed portion 420 may define at least one drain port 422. In another example, the recessed portion 420 defines more than one drain port 422.

Still referring to FIGS. 10-14, the attachment block 410 defines an opening 416 defined in the recessed portion 420 of the monolithic body 412. The opening 416 may be sized and shaped for receiving a mount fastener 450, such as a deck screw. In one example, the opening 416 is threaded such that it is configured to threadedly engage with a mount fastener 450.

In accordance with above, the mounting device 400 may further include a mount fastener 350 removably coupleable with the opening 416. In one example, the mount fastener 450 is a screw. In another example, the mount fastener 450 is threadedly engageable with the opening 416. The attachment block 410 may be rotatable 360° about the mount fastener 450 when it is loosely positioned in the opening 416 through the roof 800 to position the attachment block 410 at the desired orientation.

Still referring to FIGS. 10-14, the attachment block 410 further includes a clip attachment portion 418 defined in the monolithic body 412. The clip attachment portion 418 is configured to receive at least a portion of a clip and clip fastener 440 to couple the clip 510 and attachment block 410 together. The clip fastener 440 may be a screw, such as a self-drilling screw. In one example, the clip attachment portion 418 includes at least one opening 430, see FIGS. 10 and 11. The opening 430 may be defined anywhere on the receiving surface 414. In another example, the clip attachment portion 418 may include a plurality of openings 432, such as two, three, four, five, etc. number of openings 430. For example, referring to FIG. 12, the clip attachment portion 418 includes three openings 430 aligned along a center axis A. A plurality of openings 430 may be arranged in a single row parallel to a center axis A or without regard to the center axis A. The plurality of openings 432 may be arranged in any manner on the receiving surface 414.

Figure 14:
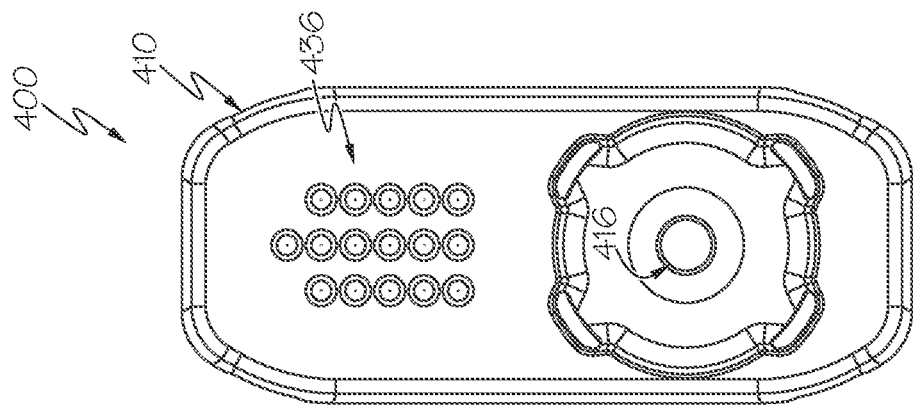
FIG. 14 is a top view of a mounting device.
Figure 13:
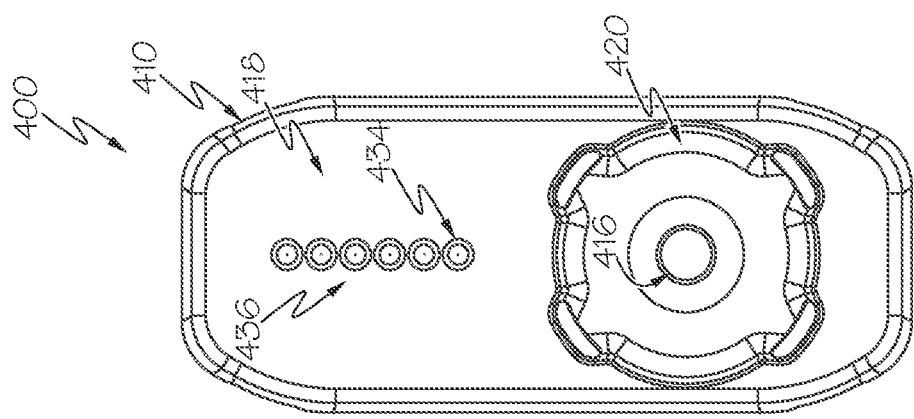
FIG. 13 is a top view of a mounting device.
Figure 12:
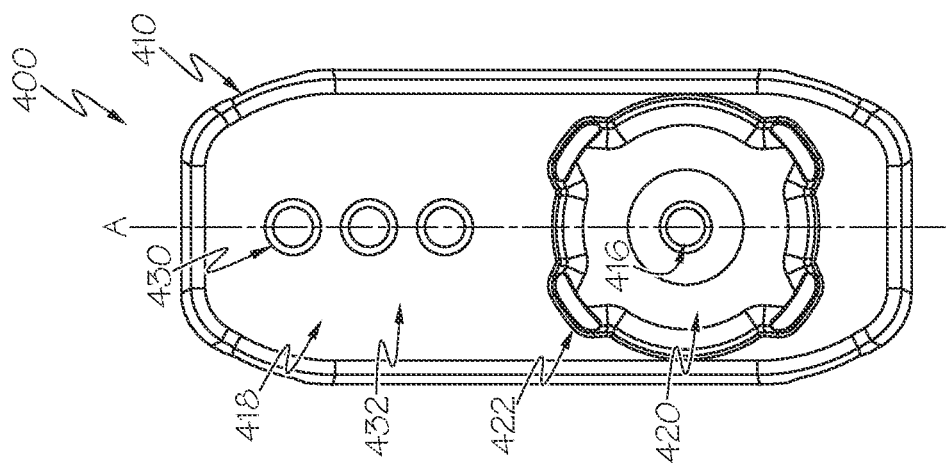
FIG. 12 is a top view of a mounting device.

Referring to FIGS. 13 and 14, the clip attachment portion 418 may include at least one dimple 434. In another example the clip attachment portion 418 includes more than one dimple 434, such as a plurality of dimples 436. The plurality of dimples 436 may be arranged in a single row parallel to a center axis A. In another example, the plurality of dimples 436 may be arranged in two or more rows parallel to the center axis A. The plurality of dimples 436 may be arranged in any manner on the receiving surface 414. The plurality of dimples 436 may be penetrable by a clip fastener. For example, referring to FIG. 15, the clip fastener 340 (not shown) may be secured to the mount 300 by penetrating one of the plurality of dimples 436, and threadedly engaging with both the clip 510 and the one of the plurality of dimples 436 of the mounting device 400. In some non-limiting embodiments or aspects, the clip fastener 440 may include a penetrating portion that is configured to penetrate the dimple 434. For example, the penetrating portion of the fastener may include at a tip of the clip fastener that is smaller in diameter compared to the rest of the clip fastener 340 to allow easier penetration of the plurality of dimples 436. Additionally or alternatively, the clip fastener may include a sharp tip to allow easier penetration of the plurality of dimples 436.

Figure 16:
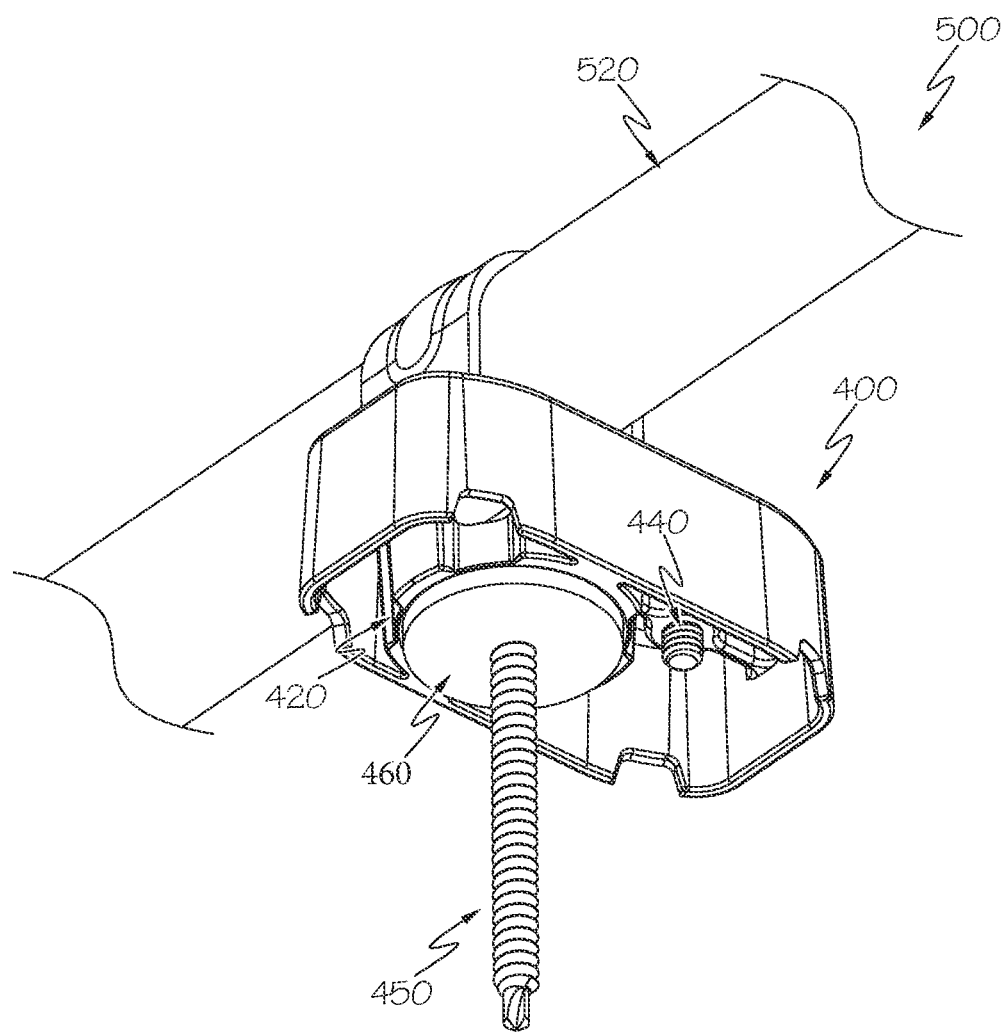
FIG. 16 is a perspective bottom of the mounting device of FIG. 11.
Figure 17:
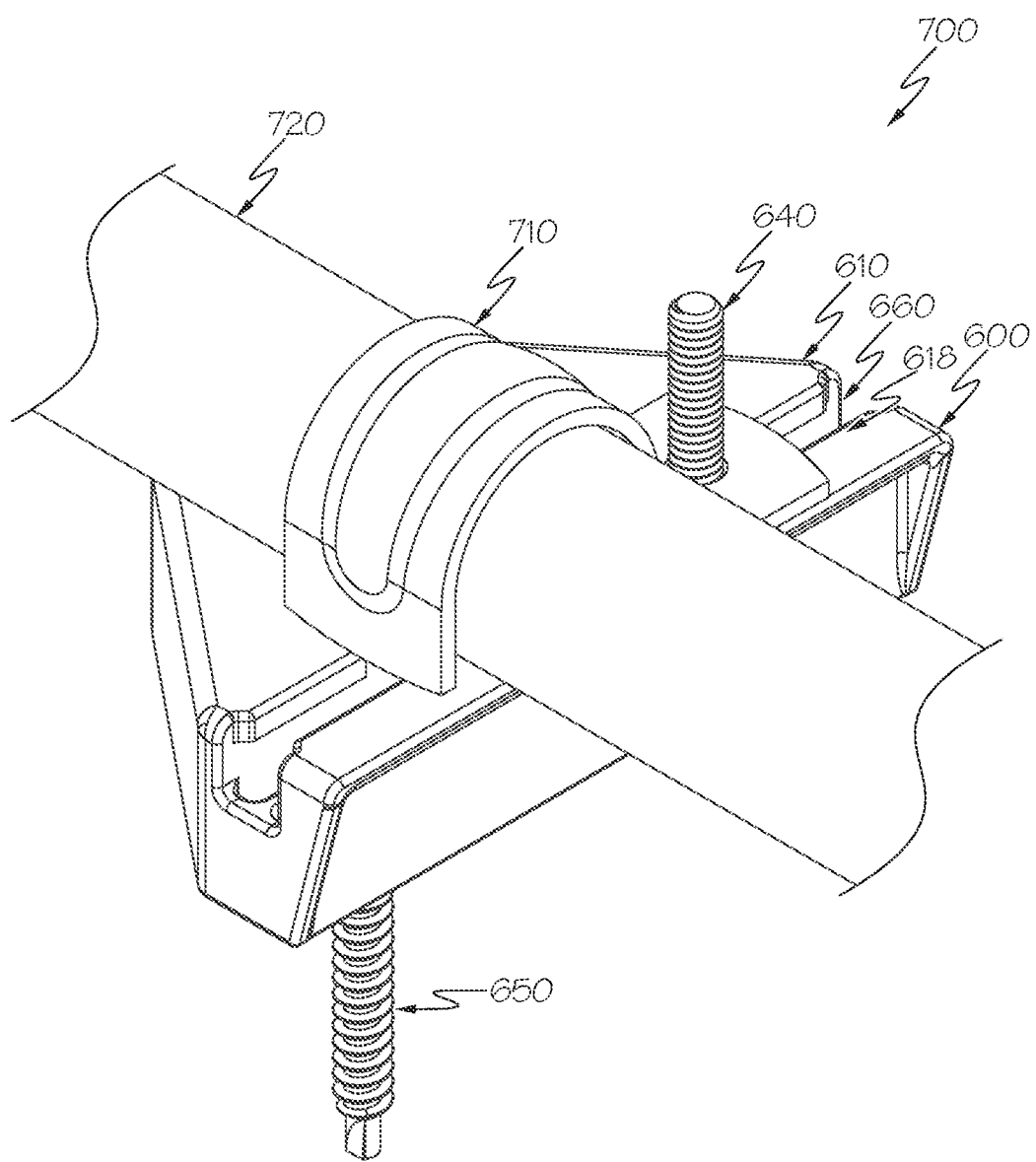
FIG. 17 is a perspective top view of a mounting device.
Figure 18:
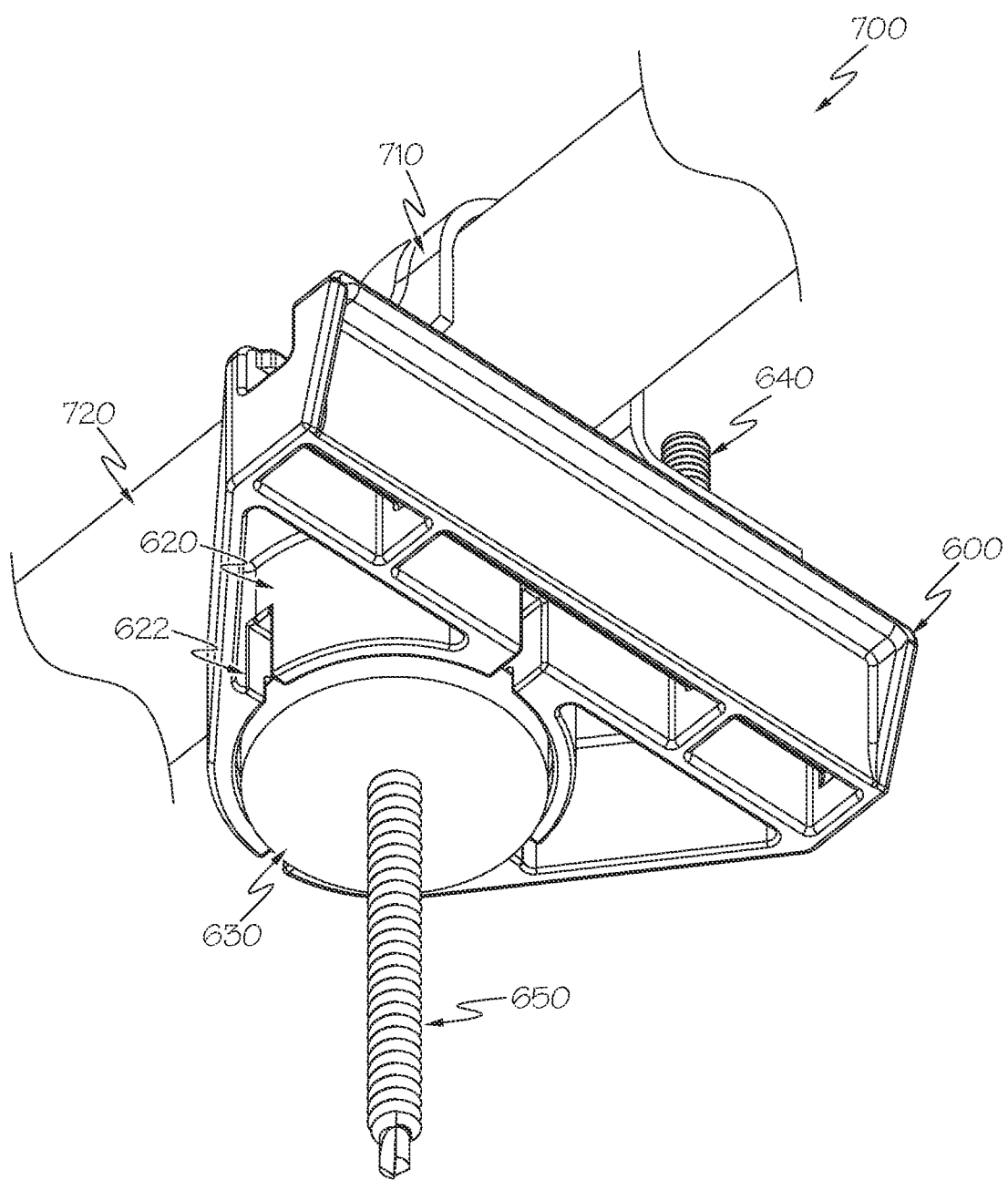
FIG. 18 is a perspective bottom of the mounting device of FIG. 17.
Figure 19A:
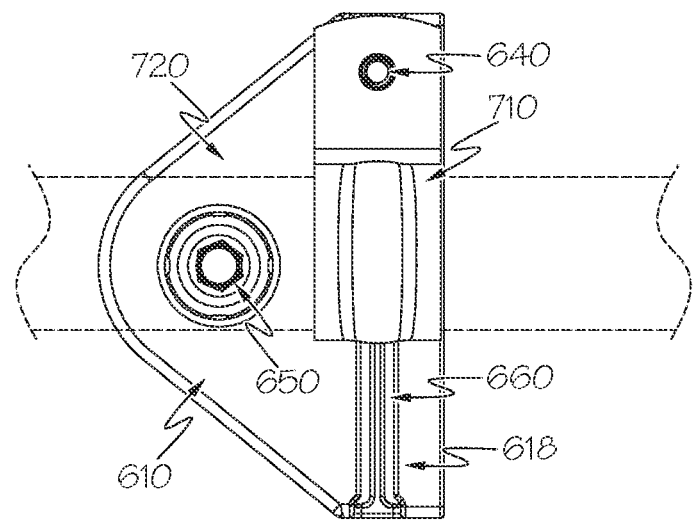
FIG. 19A is a top view of the mounting device of FIG. 17.
Figure 19B:
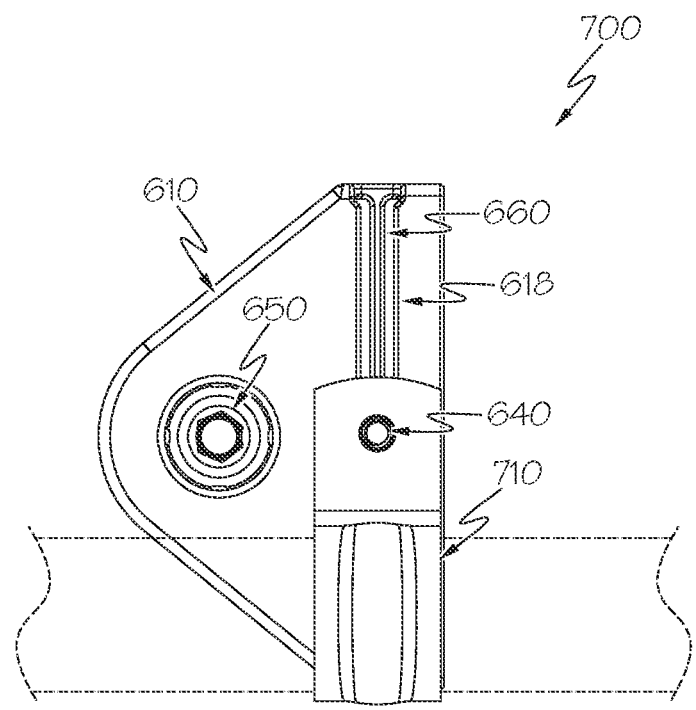
FIG. 19B is a top view of the mounting device of FIG. 17.
Figure 19C:
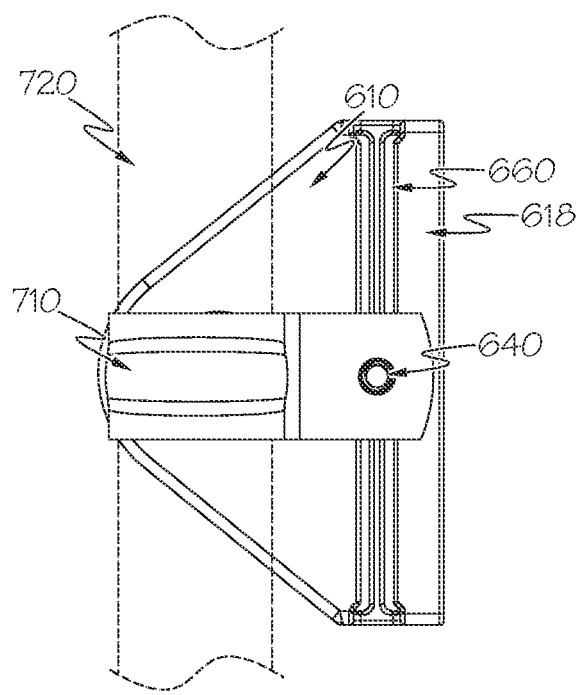
FIG. 19C is a top view of the mounting device of FIG. 17.
Figure 19D:
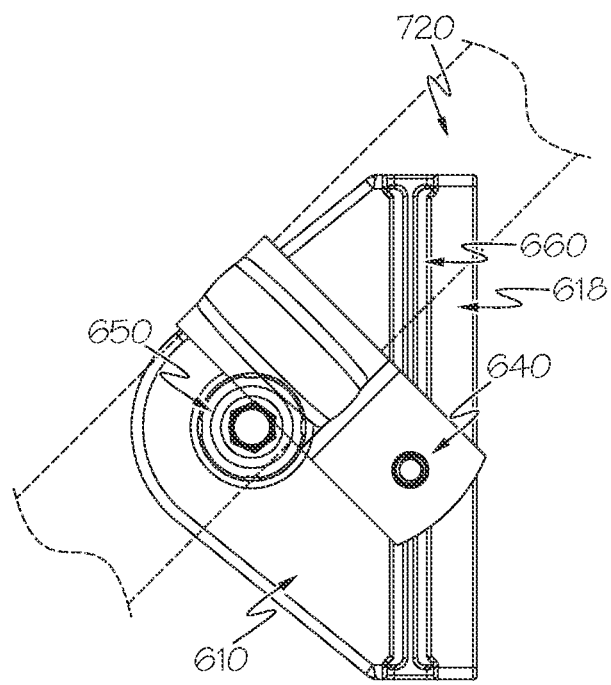
FIG. 19D is a top view of the mounting device of FIG. 17.

Referring to FIG. 16, the mounting device 400 may further include a seal 460. In one example, the seal 460 is a dual-seal pad. The seal 460 may be coupled to the recessed portion 420 of the attachment block 410, see FIG. 16. In some non-limiting embodiments or aspects, the clip fastener 440 may penetrate a dimple 436 or an opening 430 from the top as shown in FIG. 16.

Figure 15:
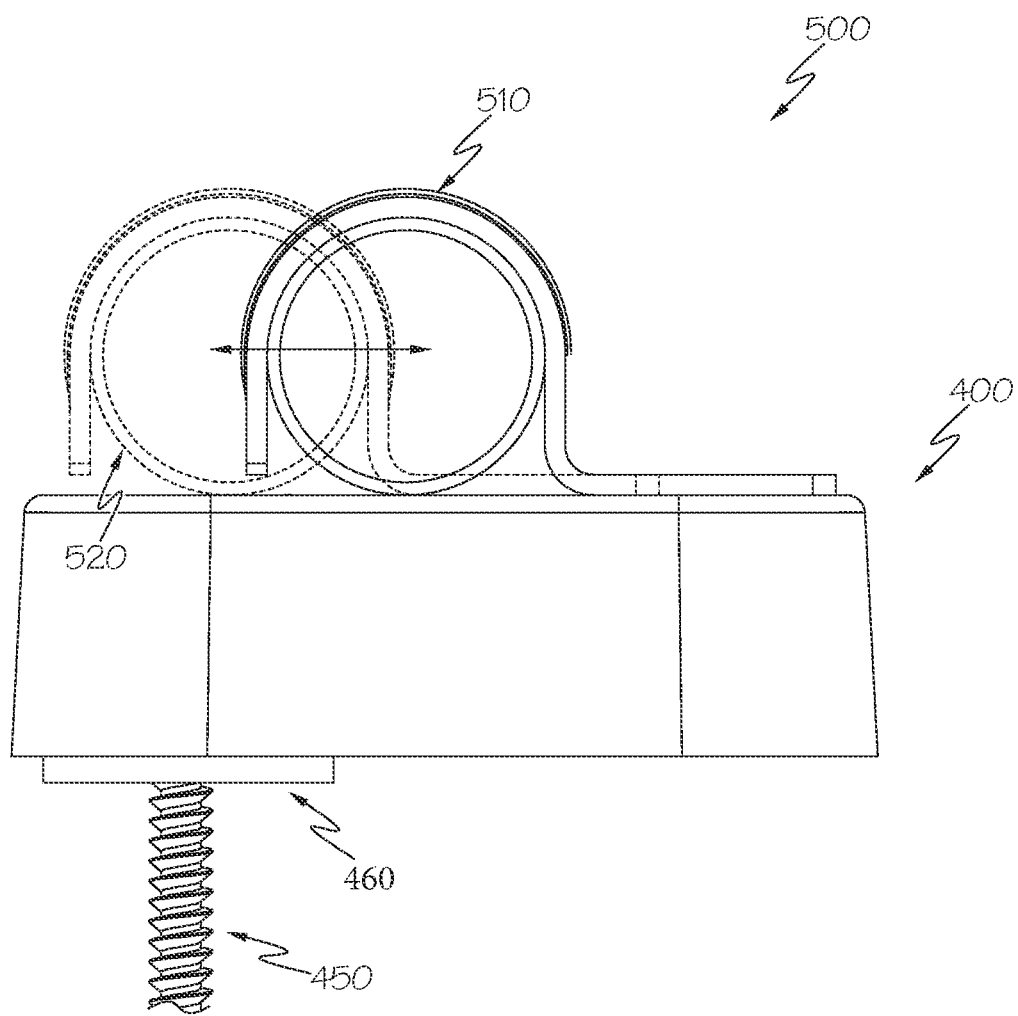
FIG. 15 is a side view of the mounting device of FIGS. 13 and 14.
Figure 20:
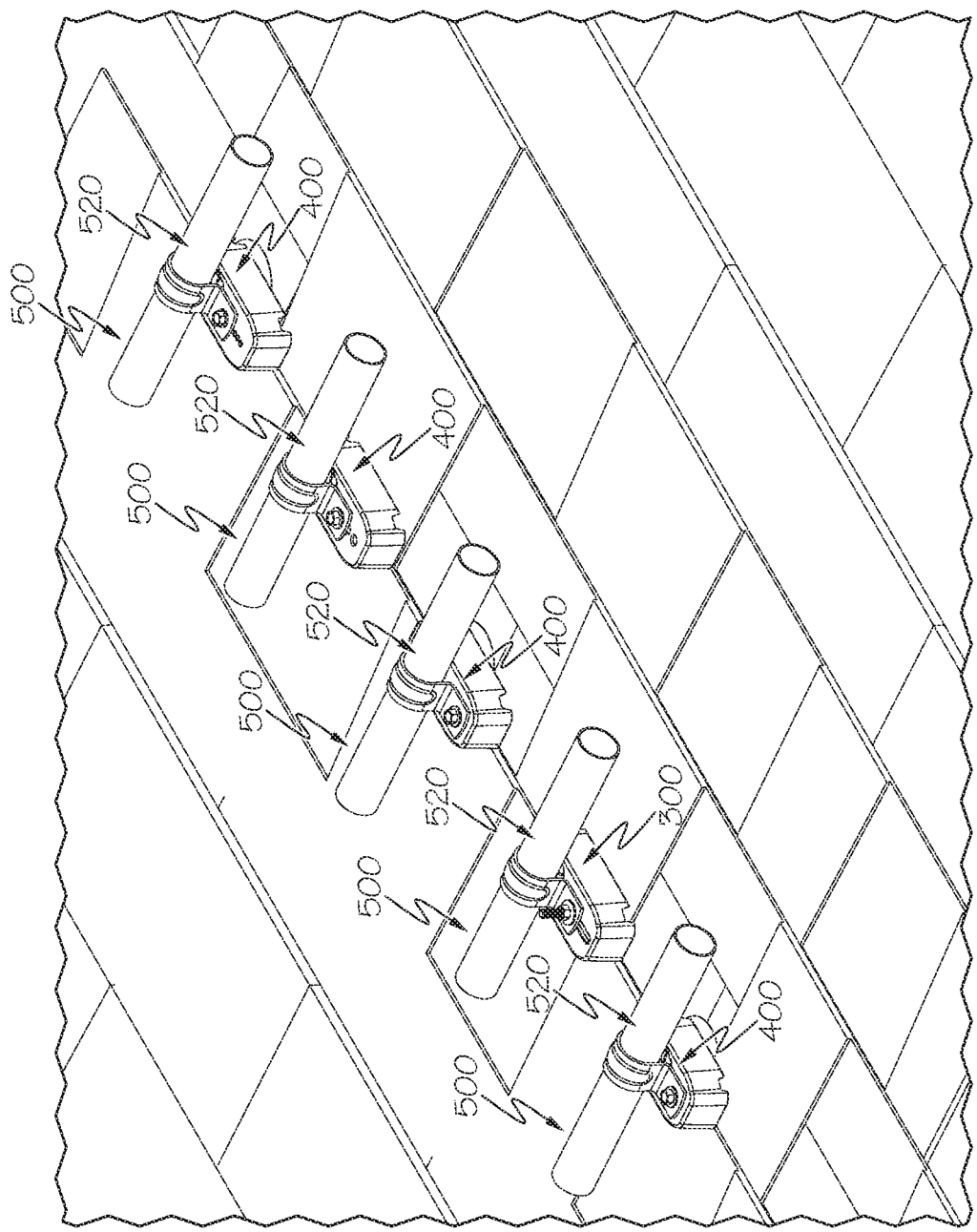
FIG. 20 is a perspective view of a mounting device on a roof.

Referring to FIGS. 15 and 16, also disclosed is a system 500 for mounting a structure 520 to a roof 800, see FIG. 20. The system 500 may include any of the disclosed mounting devices 300, 400 as shown in described herein. In one example, the structure 520 is conduit. The system 500 includes a mounting device 300, 400 as shown and described above. The system 500 further includes a clip 510 removably coupled to the mounting device 300, 400. The clip 510 may be a single monolithic structure. In one example, the clip fastener 340, 440 is threadedly engageable with both the clip 510 and the clip attachment portion 318, 418 of the mounting device 300, 400. The attachment block 310, 410 is rotatable 360° about the clip fastener 340, 440 when the clip fastener 340, 440 is loosely positioned in place in order to obtain the desired orientation of the clip 510.

As shown in FIG. 15, the recessed track 360, plurality of dimples 436, or plurality of openings 432 facilitate adjustable positioning of the clip 510 on the attachment block 310, 410, thus allowing the structure 520 or conduit to be mounted at any orientation needed for the intended application.

Referring to FIGS. 17-19D, disclosed is another example of a mounting device 600 and a system 700 for mounting a structure 720 to a roof 800 with the mounting device 600 and a clip 710. The clip 710 is configured to movably couple with the mounting device 600 at any orientation to accommodate custom mounting to the roof 800. As shown in the figures, the mounting device 600 includes an attachment block 610. The attachment block 610 includes a monolithic body 612 defining a receiving surface 614. In one example, the attachment block 610 is a single, molded piece.

Still referring to FIGS. 17-19D, the attachment block 610 defines a recessed portion 620 defined by the monolithic body 612. The recessed portion 620 may be generally round with one or more notches defined to facilitate water drainage. Specifically, the recessed portion 620 may define at least one drain port 622. In another example, the recessed portion 620 defines more than one drain ports 622.

Still referring to FIGS. 17-19D, the attachment block 610 defines an opening 616 defined in the recessed portion 620 of the monolithic body 612. The opening 616 may be sized and shaped for receiving a mount fastener 650, such as a deck screw. In one example, the opening 616 is threaded such that it is configured to threadedly engage with a mount fastener 650.

In accordance with above, the mounting device 600 may further include a mount fastener 650 removably coupleable with the opening 616. In one example, the mount fastener 650 is a screw. In another example, the mount fastener 650 is threadedly engageable with the opening 616.

Still referring to FIGS. 17-19D, the attachment block 610 further includes a clip attachment portion 618 defined in the monolithic body 612. The clip attachment portion 618 is configured to receive at least a portion of a clip and clip fastener 640 to couple the clip 710 and attachment block 610 together. The clip fastener 640 may be a screw, such as a self-drilling screw. In one example, the clip attachment portion 618 includes a recessed track 660. The recessed track 660 is configured to facilitate movement of the clip fastener 640 about the entirety of the track for securing the structure 720 at any desired orientation and position.

Although non-limiting embodiments have been described in detail for the purpose of illustration and description, it is to be understood that such detail is solely for that purpose and that embodiments are not limited to the disclosed embodiments, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, many of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A mounting device comprising:
  an attachment block, the attachment block comprising:
    a monolithic body defining a receiving surface;
    a recessed portion extending into the receiving surface and defined by the monolithic body, the recessed portion comprising a top surface and a bottom surface;
    an opening defined in the top surface of the recessed portion of the monolithic body;
    a clip attachment portion defined in the receiving surface adjacent to the recessed portion; and
    a seal coupled to the bottom surface of the recessed portion,
    wherein the recessed portion comprises at least one drain port defined in a perimeter of the recessed portion, the at least one drain port configured to facilitate water drainage from the recessed portion and the top surface thereof.

2. The mounting device of claim 1, wherein the clip attachment portion comprises a recessed track.

3. The mounting device of claim 1, wherein the clip attachment portion comprises at least one opening.

4. The mounting device of claim 1, wherein the clip attachment portion comprises a plurality of openings.

5. The mounting device of claim 1, wherein the clip attachment portion comprises at least one dimple.

6. The mounting device of claim 1, wherein the clip attachment portion comprises a plurality of dimples.

7. The mounting device of claim 6, wherein the plurality of dimples are arranged in a single row parallel to a center axis (A).

8. The mounting device of claim 6, wherein the plurality of dimples are arranged in two or more rows parallel to a center axis (A).

9. The mounting device of claim 1, wherein the opening is threaded.

10. The mounting device of claim 1, further comprising a mount fastener removably coupleable with the opening.

11. The mounting device of claim 10, wherein the mount fastener is a screw.

12. The mounting device of claim 10, wherein the mount fastener is threadedly engageable with the opening.

13. A system for mounting a structure to a roof, the system comprising:

a mounting device having an attachment block, the attachment block comprising:
   a monolithic body defining a receiving surface;
   a recessed portion extending into the receiving surface and defined by the monolithic body, the recessed portion comprising a top surface and a bottom surface;
   an opening defined in the top surface of the recessed portion of the monolithic body;
   a clip attachment portion defined in the receiving surface, adjacent to the recessed portion;
   a seal coupled to the bottom surface of the recessed portion; and
a clip removably coupled to the mounting device,
wherein the recessed portion comprises at least one drain port defined in a perimeter of the recessed portion, the at least one drain port configured to facilitate water drainage from the recessed portion and the top surface thereof.

14. The system of claim 13, wherein the clip is rotatable 360° about the mounting device.

15. The system of claim 13, wherein the clip is a single monolithic structure.

16. The system of claim 13, wherein the structure is conduit.

17. The system of claim 13, further comprising a clip fastener removably engageable with the clip attachment portion, wherein the clip fastener is threadedly engageable with the clip and the clip attachment portion of the mounting device, wherein the clip fastener is a self-drilling screw, wherein the clip is rotatable 360° about the clip fastener, and wherein the clip fastener is a bolt.

18. The system of claim 13, further comprising a mount fastener.

19. The system of claim 18, wherein the mount fastener is a screw, and, wherein the attachment block is rotatable 360° about the mount fastener.

* * * * *